United States Patent [19]

Okamoto

[11] Patent Number: 5,245,161
[45] Date of Patent: Sep. 14, 1993

[54] ELECTRIC HEATER
[75] Inventor: Hiromu Okamoto, Osaka, Japan
[73] Assignee: Tokyo Kogyo Boyeki Shokai, Ltd., Tokyo, Japan
[21] Appl. No.: 752,860
[22] Filed: Aug. 30, 1991
[30] Foreign Application Priority Data Aug. 31, 1990 [JP] Japan .................................... 2-228058
Aug. 31, 1990 [JP] Japan .................................... 2-228059

[51] Int. Cl.$^5$ .............................................. H05B 3/56
[52] U.S. Cl. .................................... 219/549; 219/535; 338/208; 338/214
[58] Field of Search ............... 219/212, 528, 535, 544, 219/542, 548, 549; 338/208, 210, 214; 174/78, 84 L, 84 R; 140/105, 106; 29/747, 508

[56] References Cited

U.S. PATENT DOCUMENTS

| 787,047 | 4/1905 | Leonard | 338/266 |
|---|---|---|---|
| 1,944,390 | 1/1934 | Aceves | 174/69 |
| 2,036,368 | 4/1936 | Siegal | 338/299 |
| 3,757,086 | 9/1973 | Indoe | 219/528 |
| 3,859,506 | 1/1975 | Weckstein | 219/552 |
| 4,037,083 | 7/1977 | Leavines | 219/552 |
| 4,392,051 | 7/1983 | Goss et al. | 219/528 |
| 4,891,500 | 9/1988 | Bloore | 219/505 |

FOREIGN PATENT DOCUMENTS 261552  6/1964 Australia ................................ 174/78
54-340004 9/1980 Japan.

Primary Examiner—Bruce A. Reynolds
Assistant Examiner—Michael D. Switzer
Attorney, Agent, or Firm—Michael N. Meller

[57] ABSTRACT

An electric heater comprises a braid construction of a plurality of strands having electric resistance, thereby the strands are heated due to a Joule heat when a current flows therethrough. The strands are braided with a core wire of tube or without cores. These strands are placed in two core wires dielectrically insulated, which core wires have exposed portions formed therein in a shape of semi-circle or arc-like at a regular interval mutually. The core wires are covered with an insulator laid thereon and an electric heating element is wound around the insulator covering in a large spiral. A C-shaped fixing piece made of metal is used to be adapted on the exposed portions of the core wires. Then the opening of the C shape of the fixing piece is pressed toward each other to close it. Claws, formed on the inner face of the fixing piece, grip firmly the strands of the heater element to the core wires.

18 Claims, 9 Drawing Sheets

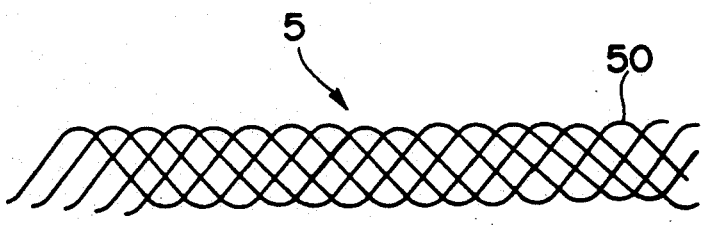 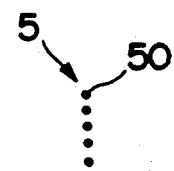
FIG. 3A  FIG. 3B
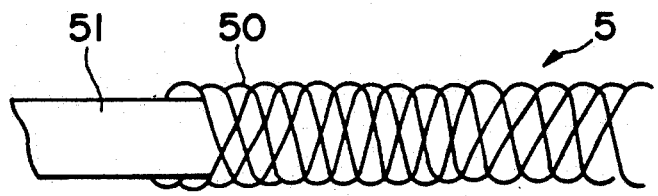 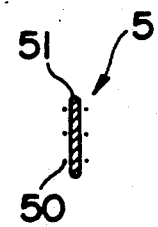
FIG. 4A  FIG. 4B

ELECTRIC HEATER

BACKGROUND OF THE INVENTION

The present invention relates to an electric heater used to an electric heating cable and a heating tube.

Nowadays, transporting high-viscosity oil and the like through pipes, the viscosity of the moving oil has been reduced by electrical-heating of the pipe line in order to improve an efficiency of transportation of oil. According to the prior art, such electrical heating system is constructed, for example, by an electric heating cable consisting of a feeder line and an electric heater, respectively are covered by a inorganic insulating cover material, and a heat retaining material made of calcium silicate and the like, the electric heating cable is laid in straight or revolutionally along a longitudinal direction of an oil pipeline, consequently heat loss through the pipe is prevented. According to other example of the prior art, a small-dia pipe is welded on the oil pipeline and an electric heating cable is placed within the small-dia pipe using a skin current heating effect in the pipe. It is called a SECT (Skin Effect Current Tracing) Method. Also, such electric heating cables are used to prevent roads, pedestrian sidewalks, and pedestrian crossing bridges in cold regions from freezing and being deposited of snow, or heat buildings. In case that the electric heating cables are installed in roads and sidewalks, the cables are buried in a shape of snake under the ground of 50-100 mm in depth and cement or asphalt concrete is cast direction the snaked cable.

Other than the electric heating cable above, heating tubes have been used in order to sustain heat of the fluid flowing through the tube and control the temperature of the fluid, which heating tubes are made by integrally constructing or assembling a tube, a feeder line, and the electric heater. The heating tube is usually made of a thermal resisting tube of metal or non-metal a fluid flows therethrough, a feeder line extending along the thermal resisting tube, and an electric heater wound around the assembly of the tube and the feeder line in revolution or spirally in order to dielectrically cover the tube. Such heating tube has been employed to, for example, a medical dialyser so as to sustain heat or temperature of the dialysis liquid flowing in the tube at a human temperature. The electric heater used in the electric heating cable and the heating tube generates electrically heat due to Joule effect to heat the target material.

Next, disadvantageous features of the conventional electric heater will be described with reference to FIG. 1 and FIG. 2(A), 2(B), respectively showing the construction of the electric heating cable and a heating tube formed according to the prior art.

As shown in FIG. 1 depicting an electric heating cable, it is constructed by a feeder line 1, two core wires 2 of the feeder line 1, insulating covers 3, 4 and 9 made of insulation material, a resistance wire 5 wound around the insulating cover 4 spirally, and a shield 10. The resistance wire 5 is an electric heating means. Ordinarily, a diameter of the resistance wire 5 is AWG (American Wire Gauge) about 36-42. The two core wires 2 are developed through an exposed portion 7 formed in the insulation cover 4. The core wires 2 and the resistance wire 5 are connected each other at a connection point 8.

Such electric heating cables are attached to, for example, pipes of installations in cold regions. In operation of such electric heating cables, when an alternative voltage is impressed to the core wires 2, respective resistance wire 5 connected in a zone section between two the exposed portion 7 adjacent generates heat. Owing to the heat of respective heat resistance wires 5, the piping for installations are heated every zone section, so as to prevent a fluid flowing through the piping for installations from freezing.

Another conventional heating tube disclosed in Japan Patent Application Laid-open No. Sho 56-85352 is shown in FIGS. (A) and (B).

The conventional heating tube consists of an inner layer of tube 1, a heat generating layer 2, an outer layer of tube 3, an electric heating resin film 22, two tape-like metal foil conductors 23, and a fluoroethylene plastics tape-like protective resin film 24. The metal foil conductors 23 is covered on the electric heating resin film 22 and they are wrapped by the protective resin film 24 in a shape of sandwich in order to form a surface heating member 21. The surface heating member 21 is wound around the tube 1 and the heat generating layer 2 is constructed. The assembly of them is covered by a tube outer layer 3.

In general, the electric heating resin film 22 above is constructed by a conductive polymer and the like having a positive thermal coefficiency. When a voltage is impressed between the metal foil conductors 23, the higher the temperature rises, the higher the resistance becomes. With an improvement of the electric resistance, a current decreases and accordingly the temperature of the heat generating layer 2 decreases. As a result, the electric heater of this kind belongs to a type of self-control.

Such heating tube has been used to, for example, a medical installment as a medical tube, When AC is impressed to two tape-like metal foil conductor 23, the electric heating resin film 22 is heated. Heat generated by the film 22 warms the tube 1 to heat medical liquid such as dialysis liquid, and medical gas flowing through the tube 1, sustaining them at a fixed temperature.

The conventional electric heating cable shown in FIG. 1 and described above uses a resistance wire 5 wound around the insulation shield of the feeder line 1 in spiral as an electric heating means. The resistance wire 5 mutually is connected to the core 2 at a junction point 8. When a current is fed to the resistance wire 5, a joule effect happens generating heat. When and AC is impressed to the resistance wire generating heat in a certain temperature cycle and the cycle changes or an outside force such as a bending is applied to the resistance wire 5, the wire is apt to be broken failing to generate disadvantageously heat in a corresponding zone section. Also, a heat generation load of a resistance wire 5 when a current flows through the wire rising its temperature is large, the wire is not suitable to sustain the wire and a load to heat at a temperature zone of middle to high (more than 50° C.). In addition, because the single resistance wire 5 is joined to cores 2 at the junction point 8, it is afraid that a bad contaction happens at the point 8.

The conventional heating tube shown in FIGS. (A) and (B) are constructed to generate heat in the automatic control-type electric heating resin film 22 by impressing an AC to two insulated tape-type metal foil conductor 23. Consequently, a stable heat generation is limited in a low temperature zone and it is disadvantageously difficult to obtain a stable generation of heat at a temperature of more than 50° C.

SUMMARY OF THE INVENTION

It is the primary object of the present invention to prevent the occurrence of any non-heating zone due to a break in a heating resistance in a zone-type heat generating cable including a plurality of continuous heating zones along a feeder line.

Particularly, it is a first object of the present invention to provide a zone-type heat generating cable so designed that a heating resistance is composed of innumerable parallel circuits within the respective heating zones cyclically connected in parallel with a power source and joints of the heating zones arranged at an interval on a feeder line are electrically connected positively to core wires of the feeder line.

In accordance with the present invention, braided naked strands 50 of the braid resistance 5 are electrically connected to one another to form innumerable fine net-like parallel circuits within the heating zones L. Therefore, even if some of the strands 50 are broken, the other strands 50 maintain the electric connection. Therefore, even if any partial break is caused in the heating resistance 5 due to the occurrence of thermal expansion or contraction in the course of the installation work or use of the heat generating cable C, there is no difficulty to the generation of heat and there is no occurrence of any heating zone L failing to generate heat on the heat generating cable C.

On the other hand, a joint 6 having conductivity and a beltlike braided construction is wound around a joint portion 8 of each heating zone L from above, the resistance 5 of the braided construction covering exposed portions 7 of the feeder line 1 and thus the resistance 5 is brought into contact and connected to exposed core wires 2 of the feeder line 1. The braided strands of both the resistance 5 and the joints 6 are placed one upon another at the respective joint portions 8 so that the resistance 5 is pressed against the core wires 2 to contact therewith at multiple points. As a result, the electric connection between the resistance 5 and the feeder line 1 is ensured thus preventing the occurrence of any contact failure.

In particular, by using C-shaped fixing members 11 made to have the same width as the exposed portions 7 at the joint portions 8 so as to further narrowingly press the resistance 5 from above the joints 6 wound around the resistance 5, there is the effect of not only making the connection between the resistance 5 and the feeder line 1 more positive but also rendering the connection construction compact. Thus, there is the effect of eliminating the occurrence of connection failure at the joint portions 8, preventing the occurrence of any non-heating zone L due to such connection failure by virtue of the cooperative operation with the construction of the resistance 5 of the braided construction and preventing the occurrence of such non-heating zone L even by virtue of the joints.

It is another purpose of the present invention to provide an electric heater, without the disadvantageous problems of the prior art, having several advantages of no-wire-breaking owing to temperature cycle changes and any external pressure.

According to another purpose of the present invention, is provided an electric heating cable and heating tubes using the electric heater of the present invention in order to construct a composite tube enabling to use in a high temperature zone of to about 200° C. and having few happenings of trouble.

The electric heater of the present invention has a braided structure consisting of a single or plural strands.

The electric heaters constructed above are electrically connected to expose portions formed periodically on the cores of the feeder line at a regular interval.

According to the present invention, the braided structured electric heater is arranged around a tube and a heating tube is obtained.

The electric heating cable using the electric heater of the present invention is arranged along the tube through which a fluid flows. When a switch is turned ON, and AC voltage is impressed between two cores of the feeder line. Then, the current flows-through the electric heater of the braided structure electrically connected to the cores through multi-position of the exposed portions provided with joints generating a Joule heat. The Joule heat generated in the electric heater of the present invention heats the piping to sustain the temperature of the fluid flowing through the piping.

In case that the heating tube is connected to the route through which a fluid flows, when the switch is turned ON, a voltage is impressed to the feeder line. Accordingly, a current is fed to the electric heater of the braided structure electrically connected to the cores through multiposition of the exposed portions provided with joints generating a Joule heat. The Joule heat heats the tube and it is transmitted to the fluid flowing through therein sustaining it at a fixed temperature.

BRIEF DESCRIPTION OF THE DRAWING

FIGS. 3 and 4 (A), (B) are construction explanations of an embodiment of the present invention;

PREFERRED EMBODIMENT

As shown in FIGS. 3 and 4, the electric heater 5 consists of a plurality of strands 50. The strands 50 are naked resistance wires of diameters of about 0.08-0.1 mm. These strands 50 are arranged in a manner of mutual-in-and-out and form a braid. FIGS. 3 (A) and 3 (B) show one being braided of a single strand or a plurality of strands 50 in a shape of band. FIGS. 4 (A) and 4 (B), respectively show another one being braided of a single strand or a plurality of strands 50 around a core member 51. Such constructed electric heater 5 is used in various apparatuses as shown in FIGS. 5 to 16.

Figure 1:
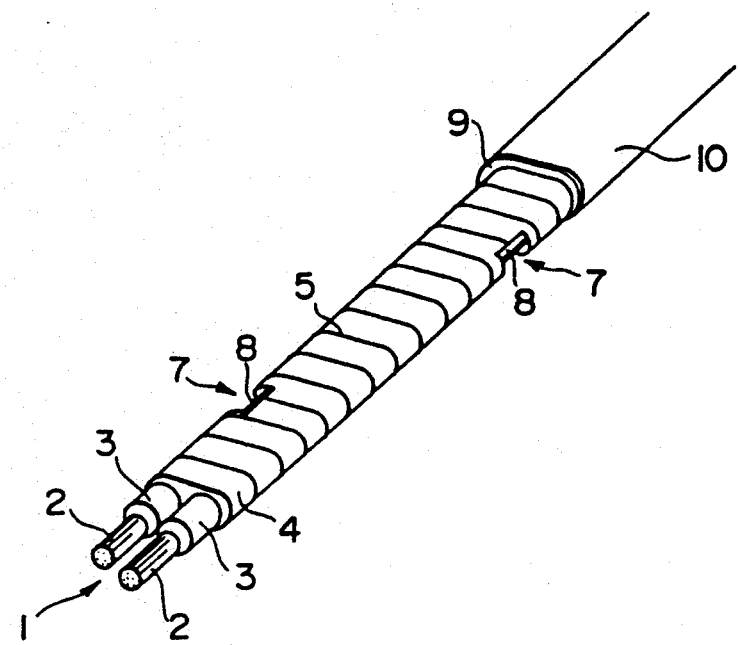
FIGS. 1 and 2 (A), (B) are construction explanations of the conventional electric heating cable and a heating tube.
Figure 2A:
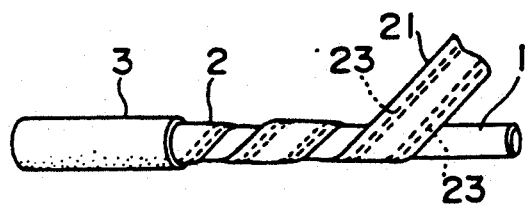
Figure 2B:
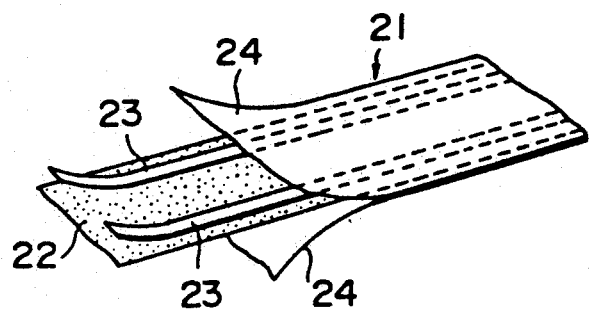
Figure 5:
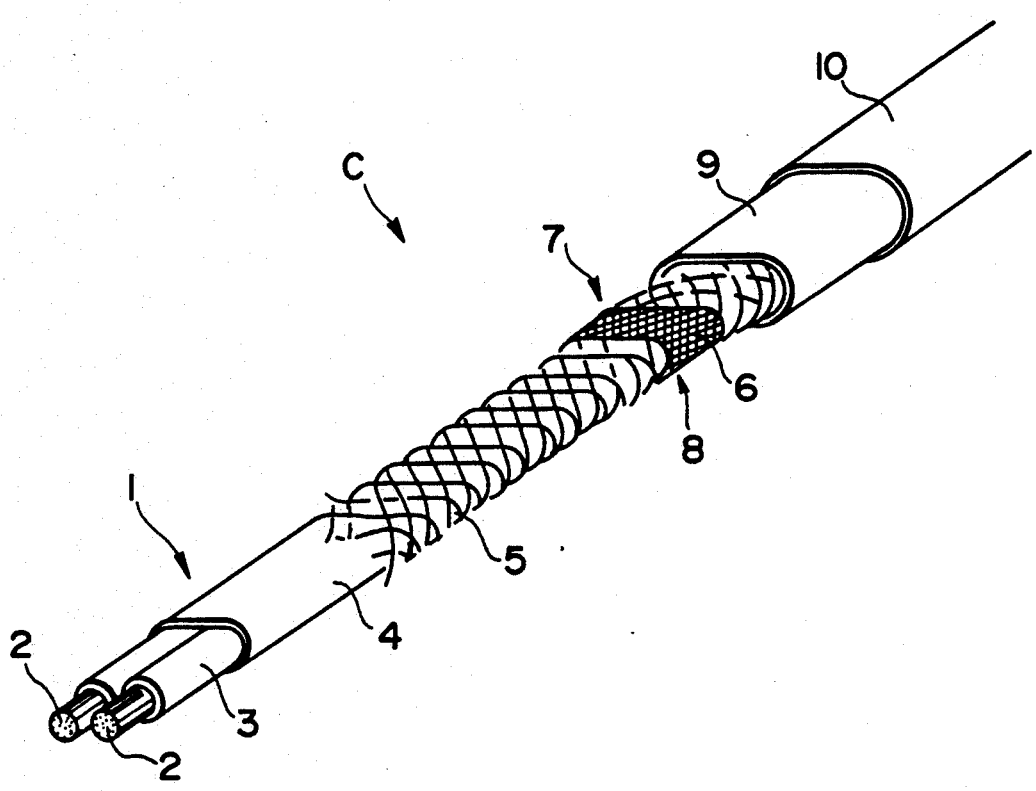
FIG. 5 is an construction explanation of the electric heating cable of the first embodiment or application of the present invention.
Figure 6:
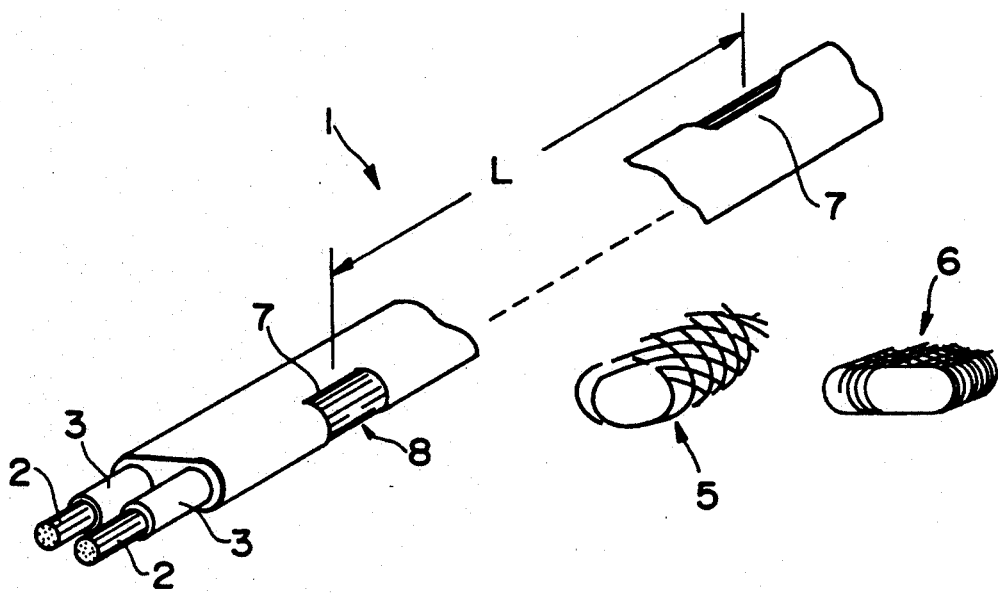
FIG. 6 is an exploded perspective view of a part of the arrangement shown in FIG. 5, FIG. 7 (A), (B), (C) are explanations of a fixing piece for connecting the electric heater to the feeder line.

FIG. 5 is a construction explanation of the electric heater according to the first embodiment of the present invention. FIG. 6 is an exploded perspective view depicting a part of the heater shown in FIG. 5. FIGS. 7 (A), (B), and (C), respectively show explanation of fastner pieces for joining the electric heater to the feeder line and show the case in which the electric heater of the present invention is applied to the electric heating cable for low and middle temperature (0°-50° C., 50°-120° C.). In FIGS. 5-7, the parts having the corresponding function to these of FIGS. 1 and 2 have the identical reference numerals and some parts will be explained again in detail a little.

FIG. 5 shows the feeder line 1, two core wires 2 of the feeder line 1, an insulator 3 covering around the feeder line 1, and another insulator 4 for assembling both the insulators 3. The core wires 2 are concentrated strands of, for example, copper or plated of nickel plating or of copper plated with a silver of high conductivity. The insulators 3 and 4 are fluoroethylene plastics of high thermal-resistive.

The electric heater 5 constructed according to the present invention has a braided construction braided of the naked strands 50 of the resistance wires. A joint 6 is a thin wire such as copper-made one of high conductivity and constructed in a brand-shape of braided construction. Similar to one shown in FIG. 6, the exposed portion 7 is formed in these two cores 2 and the joint portion 8 is formed thereon to connect the core 2 to the electric heater 5. It is noted that the exposed portion 7 are alternately formed at a regular interval L in two cores 2 and a joint 6 of the braided construction is wound on the developed portion 7. The joint 6 connects the electric heater 5 to the cores 2 at respective joint portions 8 by pressing the electric heater 5 of a braid construction to cores 2 coming in contact through an number of points or lines. The heat insulator 9 covers the joint 6 and other elements and the outer shield 10 protects the insulator 9. An electric cable C of the present invention apparently consists of the feeder line 1, the electric heater 5, and joints 6 and the other.

For example, one manufacturing method of the electric heating cable C above will be explained. First, the core wire 2 consisting of strands of a plurality of fine conductors such as silver plated copper wires is wound around the insulator 3 making a covered conductor. Two conductors are assembled side by side and they are covered by the insulator 4, so that the feeder line 1 provided with two core wires 2 and of a ribbon-like is molded with a plastic. Next, outer portions of the insulator 4 around the feeder line 1 are cut at a regular interval L in a shape of semi-ring alternately. Consequently, the core wires 2 are half developed with a fixed width informing exposed portion.

Figure 7A:
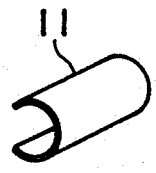
Figure 7B:
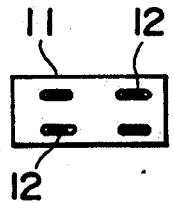
Figure 7C:
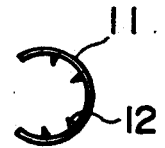
Figure 8:
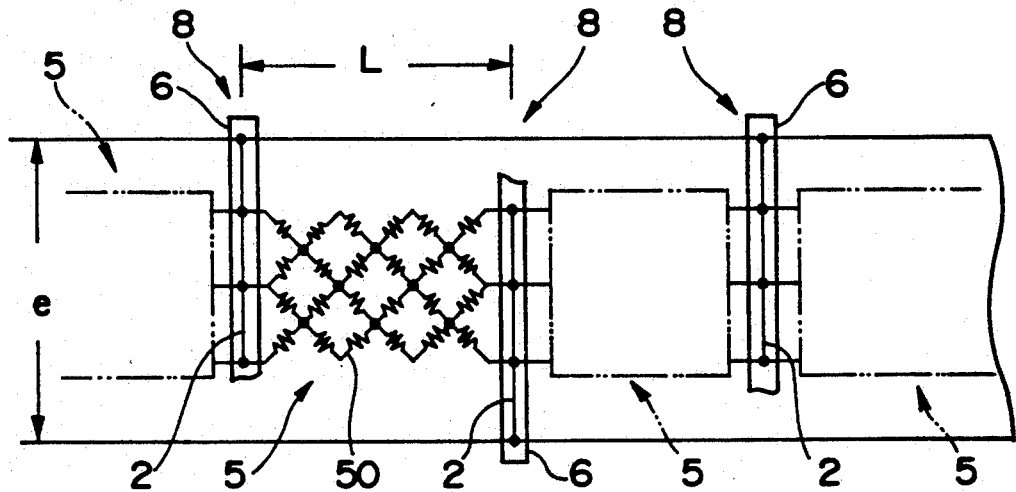
FIG. 8 shows primitively an electricity layout of the electric heating cable.

After the formation of the exposed portion 7, the strands 50 of resistance wires are braided around the feeder line 1. Then, the braid is forcibly wrapped by the braided electric heater 5. In order to make a contact between the electric heater 5 and two cores 2 sure, the width of the joint 6 of a braided structure to be wound on the exposed portion 7 is determined so as to be narrow a little than the width of the exposed portion 7. A fixing member 11 of a C shape as shown in FIGS. 7(A)-7(C) is applied on the braid of the joint 6 and an open portion of the fixing member 11 is pressed from both sides of the member, so that claws 12 provided on an inner face of the fixing member invade into a gap between strands of the core wires 2. As a result, the core wires 2 are fixed in a shape. A plurality of strands 50 consisting of the electric heater 5 are pressed in points or lines and the electric heater 5 comes into contact with the cores 2 through a number of positions joining them electrically a principle of connection between the electric heater 5 and the cores 2 is shown in FIG. 8. As apparent from FIG. 8, a plurality of strands 50 constituting the electric heater 5, respectively come into contact with the cores 2 through multi-point and they are electrically connected firmly. After that, the insulator 9 is extruded and plastic-molded so as to cover these cores 2. If necessary, a shield 10 such as a braided fiber or a stainless sheath is applied thereon to protect them.

Figure 9:
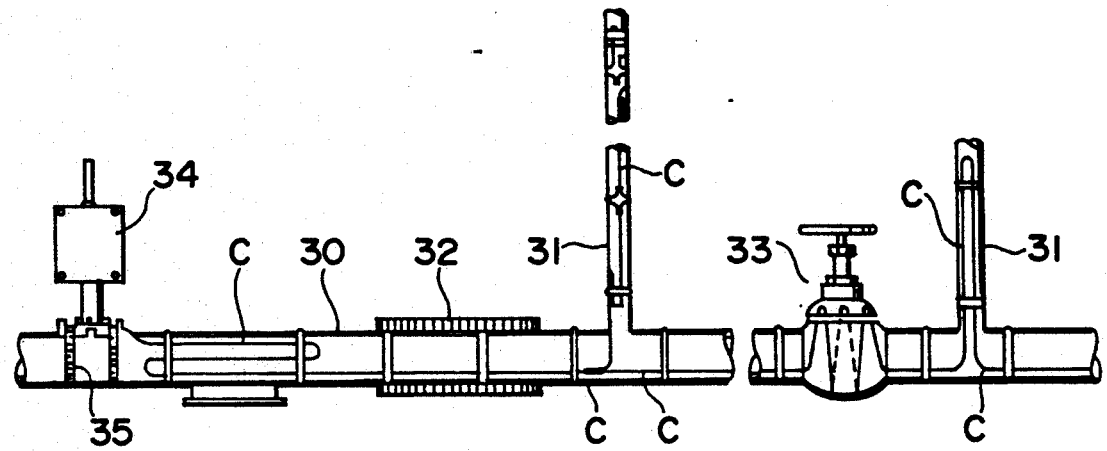
FIG. 9 is an explanation of the electric heating cable of the first embodiment which is use according to the present invention.

The electric heating cable C manufactured according to the present invention is used in an installation of, for example, an oil plant as shown in FIG. 9.

As shown in FIG. 9, a main pipe 30 through which a fluid flows has a branch pipe 31, a heat insulator 32 provided on a part of the main pipe 30, and a manual control valve 33, and also a power box 34 and a band 35 for fastening the power box 34. The electric heating cable C according to the present invention is adapted to be arranged along the main pipe 30 as shown. The cable C has a branch portion separated from a suitable branch point c and extends into the branch pipe 31. In particular, the electric heating cable C is turned twice or triple on the manual control valve 33 to strengthen a heating effect thereon. When an AC voltage is impressed from the power box 34 to the electric heating cable C, the strands 50 of respective braids of the electric heater 5 is heated by a Joule effect. Consequently, the fluid flowing through the interior of the main pipe 30 and the branch pipe 31 or the manual control valve 33 is heated by the hot electric heater 5 and the temperature of the fluid is detected by a temperature detector (not shown) in order to adjust the fluid flowing through the main pipe 30 and the branch pipe 31 at a fixed temperature.

Figure 10:
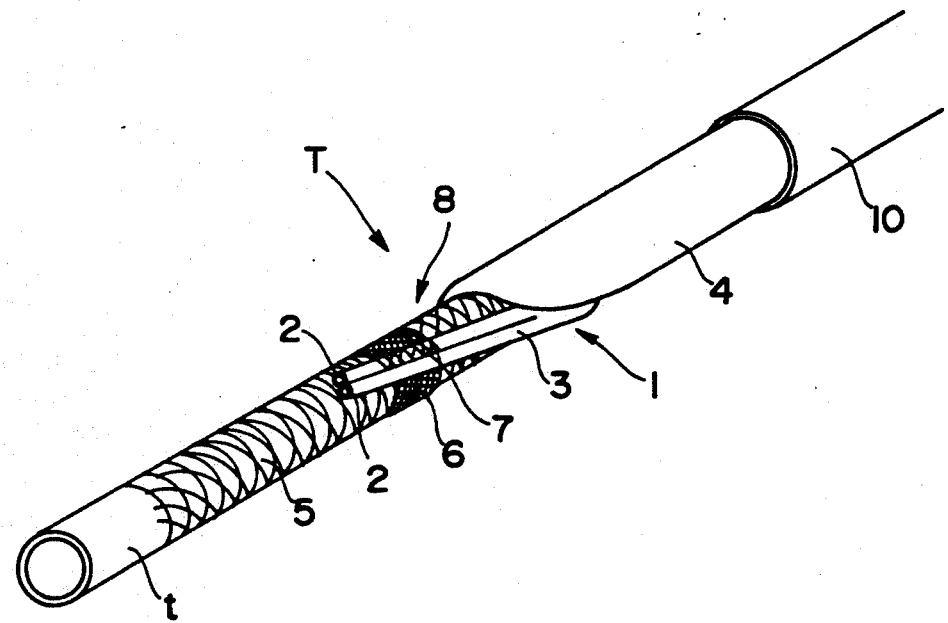
FIG. 10 is a construction explanation of the second embodiment in use according to the present invention.
Figure 11:
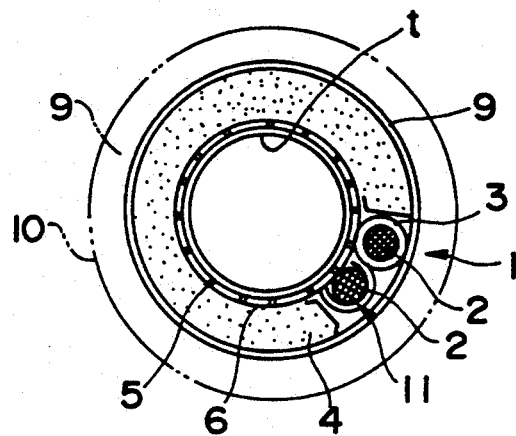
FIG. 11 is a section explanation of a part of the arrangement shown in FIG. 10.
Figure 12:
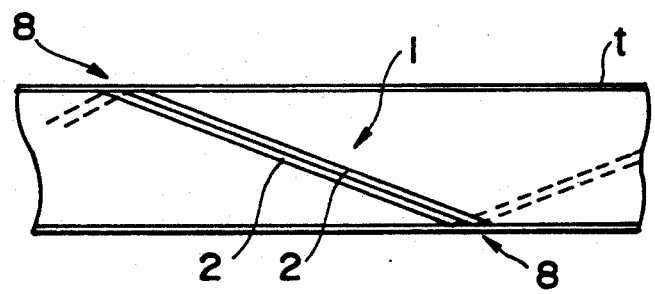
FIG. 12 is a longitudinal section explanation of the heating tube shown in FIG. 10.
Figures 13A, 13B, 13C:
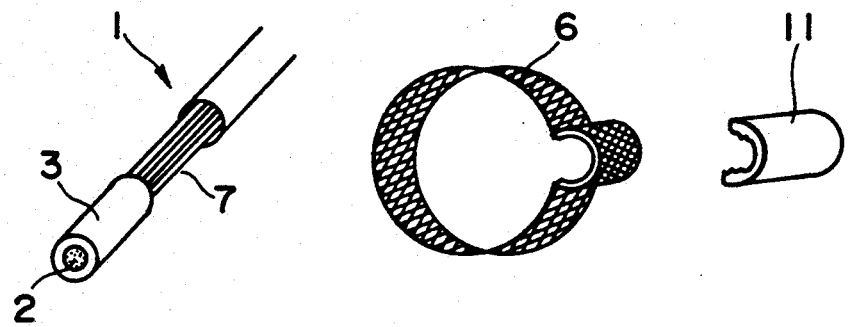
FIG. 13 (A), (B), (C), are exploded explanations of the connection of the joint.
Figure 14:
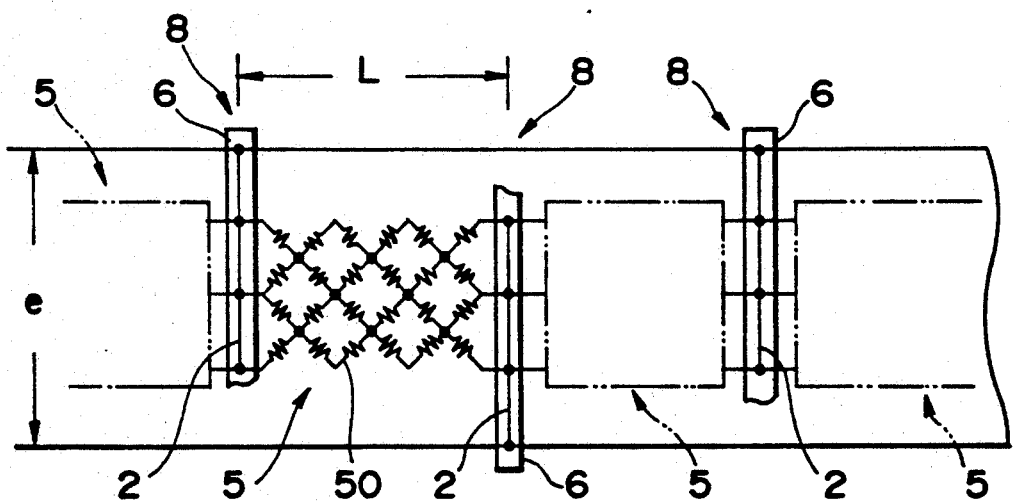
FIG. 14 is a primitive electric layout of the heating tube shown in FIG. 10.

FIG. 10 is a construction explanation of the heating tube according to the second embodiment of the present invention, FIG. 11 is a section showing a part of FIG. 10, FIG. 12 is a longitudinal explanation of the heating tube shown in FIG. 10, FIG. 13 (A) (B), and (C) are exploded explanation of connection of a joint, and FIG. 14 a primitive layout of electricity of the heating tube shown in FIG. 10. FIG. 10 shows a heating tube T having a central tube t making a fluid flown therethrough.

In FIGS. 10 and 11, the central tube t is a metal tube treated by a fluoric resin or an insulation. The heating tube T has a feeder line 1, two cores 2 for the feeder line 1, an insulator 3 covering both the cores 2, and another insulator 4 filling the gap or space generated by existence of the feeder line 1 and making the whole section of the tube T circular. Also, the heating tube T has the electric heater 5 of a braid arranged around the tube t, a joint 6, and the exposed portion 7 of the two cores 2. The cores 2 and the electric heater 5 are joined through the exposed portion 7 (see FIGS. 10-13).

The exposed portion 7 is formed mutually in the two core wires 2 wound around the tube t in a large spiral at a fixed interval L and the joint 6 is fixed to the exposed portion 7. A shield or cover 10 is applied on the insulator 4 and the cover 10 is secured in place by the fixing piece 11. The material used to make the cores 2, the insulators 3 and 4, the electric heater 5 is the same as the corresponding parts of the first embodiment of the present invention. Therefore, as shown in FIG. 10, the tube t, the feeder line 1, and the electric heater 5 and the other parts construct the heating tube T.

The heating tube T above is manufactured by, for example, the following steps.

First, the insulator 3 is laid around the core wires 2 making a covered conductor 1. The two covered conductors 1 are arranged side-by-side and a two-core wire feeder line 1 is obtained. Portions of the insulator 3 at a regular interval L are mutually cut out. A circumferential part of the insulator 3 is cut to develop a part of the core wires 2 forming the exposed portion 7 having a predetermined width.

While, a braid of the resistance line is arranged around the tube t and the electric heater 5 pushes the braid from the surroundings of the heater 5. The feeder line 1 is wound in a large spiral around the tube t covered by the electric heater 5. In order to come the electric heater 5 into contact mutually with two core wires 2, a joint 6 made in a ring of the braided structure of the substantial same width as that of the exposed portion is applied to the exposed portion 7 as shown in FIG. 13. Similar to the case shown in FIG. 7, a C shape fixing piece 11 is covered on the exposed portion 7 and an open portion of the fixing piece 11 is pushed from both the sides of the C shape fixing piece 11, thereby the claws 12 formed on the inner face of the fixing piece 11 invade fixedly into the gap between strands of the cores 2. As a result, midportion of the ring-like joint 6 is squeezed as shown in FIG. 13 (B) and a plurality of strands 50 constructing the electric heater 5 are pushed and come into contact forcibly the cores 2. In detail, due to such pressing, the electric heater 5 comes into contact electrically and mutually with the cores 2 through multi-point. The primitive connection of the electric heater 5 and the cores 2 is shown in FIG. 14. In this case, a plurality of strands 50 as shown constructing the electric heater 5 come into contact with the core wires 2 through multi-point forming a complicated parallel circuit. Then, the gap left by two feeder lines 1 wound in a large spiral around the tube t is filled by the insulator 4. The deformed section of the assembly is made neat in a circle. After the section controlling step, the cover 10 covers the insulator 4 and the joint 6 and other parts so as to obtain the heating tube T.

It is noted that it is possible to construct a composite tube of the single heating tube t by proving further an insulator 9 on the cover 10 and a protective shield 10 on the insulator 9 as shown in FIG. 11 by two-dash chained line.

Figure 15:
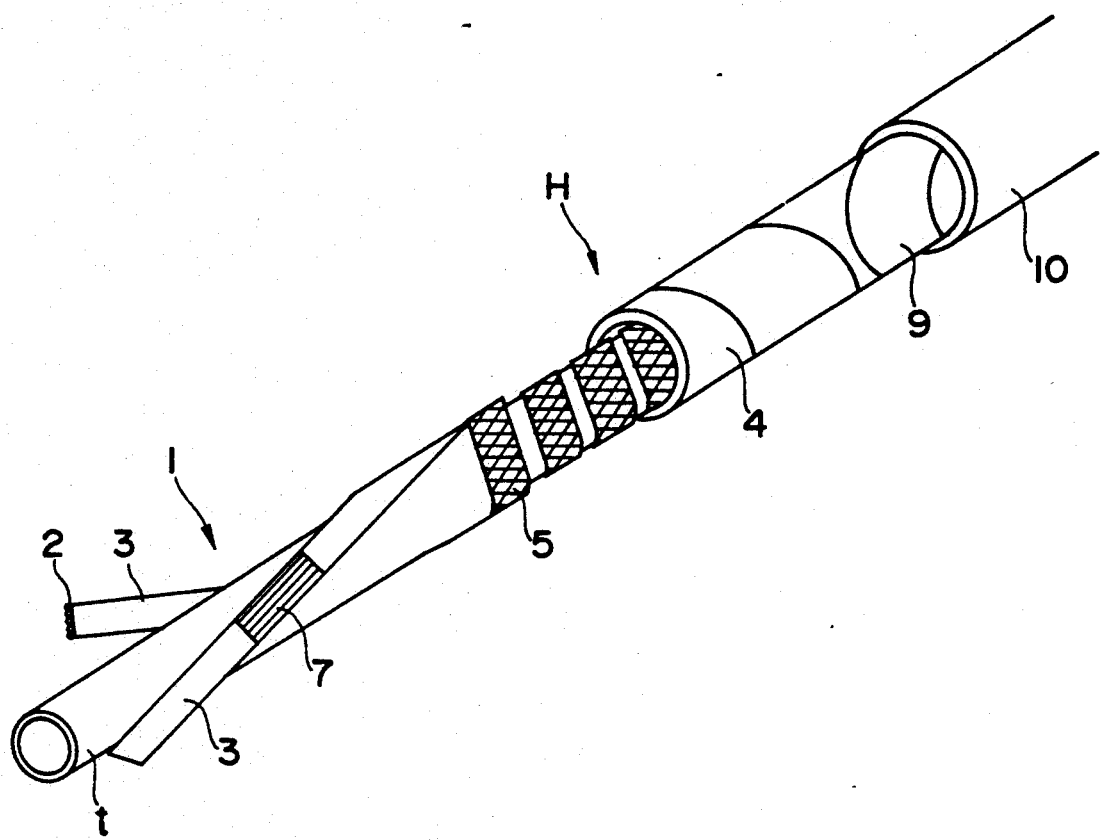
FIG. 15 is a construction explanation of another heating tube to which the present invention is applied.
Figure 16:
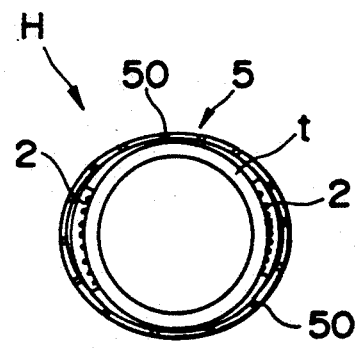
FIG. 16 is a section explanation of a part of the arrangement depicted in FIG. 15.
Figure 17:
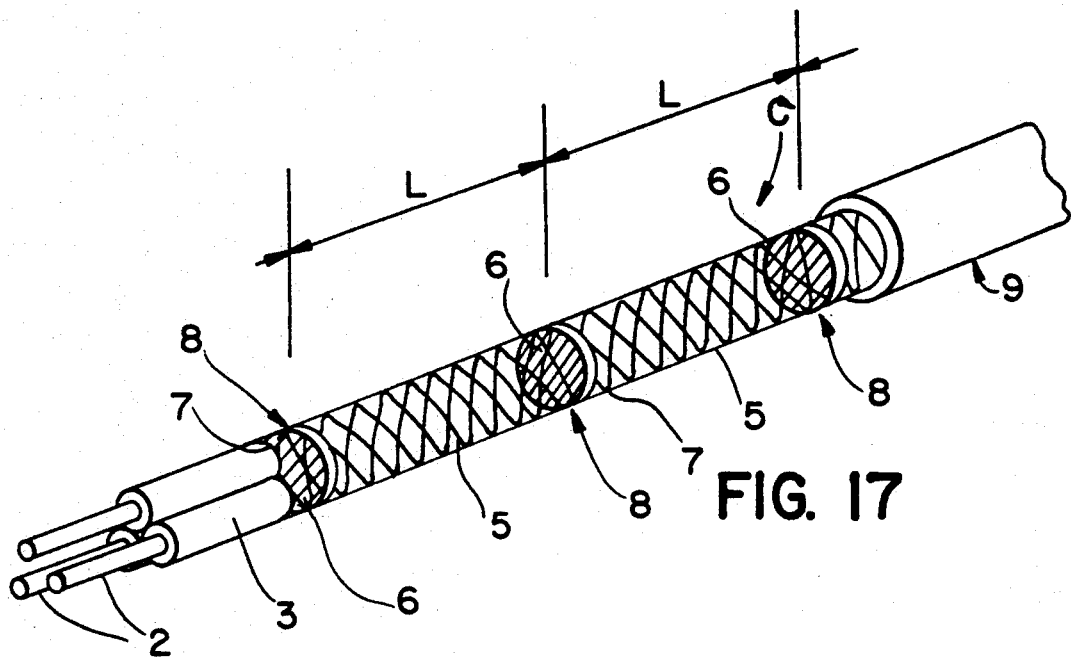
FIG. 17 is a diagrammatic view of another embodiment of the present invention in which the feeder line is connected to a three-phase AC source.
Figure 18:
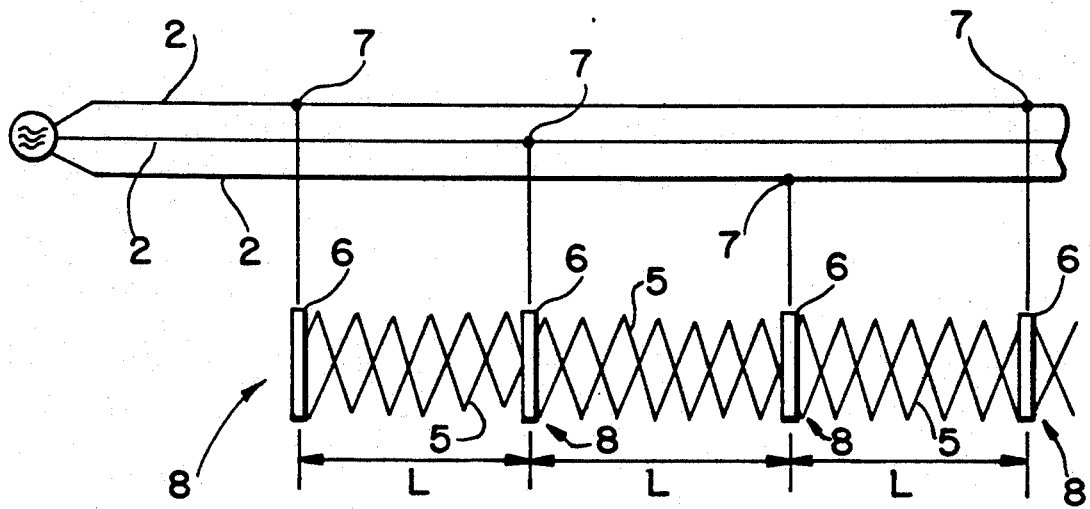
FIG. 18 is an electric connection diagram of FIG. 17.

FIG. 15 is a construction explanation of a usage of another heating tube according to the present invention. The heating tube shown in FIG. 15 is differed from that shown in FIG. 10 only in the structures of the feeder line 1 and the electric heater 5. As shown, the feeder line 1 and the electric heater 5 use a plurality of strands 50 to form a flat braid. It is possible to omit the core 51 from the braided band-like electric heater 5 similar to the cases shown in FIG. 3 (A), (B) and FIG. 4 (A), (B). As shown in FIG. 15, according to the embodiment of the present invention, two flat core wires 2 having the exposed portion 7 of the feeder line 1 are wound in a large spiral at a distance of about 180 degree as shown or in a side-by-side relation around the outer periphery of the tube t. The electric heater 5 of a flat braid is laid thereon spirally. Then similar to the embodiment of FIG. 10, the insulators 3 and 4 are plastic-molded and the cover 10 is provided thereon. According to the construction of the embodiment shown in FIG. 15, the feeder line 1 and the electric heater 5 are both formed in flat, so that it is possible to obtain the compact heating tube T.

Such heating tube T is used as a conduit of electric heating sustaining fluid and of gas analyzer, and as a medical tube which is arranged on the medical installation and the like. When a voltage is impressed to two core wires 2 of the heating tube T installed, a current is flown to the electric heater 5 through the joint 6 generating a Joule heat. The Joule heat generated in the electric heater 5 is transferred to the tube t, thus a liquid or gas in the tube t is heated or sustained at a fixed temperature.

Meanwhile, according to the embodiments above, the electric heater 5 consists of a plurality of strands (5) of resistance wires made of nickel chrome, however, it is possible to employ other strands made of a carbon fiber, or twisted strand of carbon fiber, a ceramic and a plastic fiber, or a strand of ordinal metal resistance wire and a carbon fiber. Also it is constructed the electric heater 5 of three cores so as to impress a three-phase AC similar to the case of an AC voltage using two core wires.

Although a case of the electric heater 5 consisting of a plurality of resistance wires was exemplified and explained, it is possible to use a braid of a single wire, of a carbon fiber, or a carbon fiber and ceramic material and plastics, or of a normal metal resistance wire and a carbon fiber. In addition, concerning the cover of the insulators 3, 4 and the tube t, it is possible to construct the electric heater 5 by a silicagel fiber, a ceramic fiber or a polyamide film. An electric heater suitable to a high temperature can be provided by constructing insulators of these ceramic fibers in a shape of sheath. Although a case of two core wires being used and a voltage being impressed thereon has been explained, it is possible to use three core wires, a three-phase AC being impressed thereto.

In short, the electric heater of the present invention connected to the feeder line so as to generate a Joule heat is constructed by a braid of a plurality of strands of resistance wires, respectively connected to the feeder line through a number of points.

Consequently, according to the present invention, it is possible to obtain an electric heater having a wide usage range of temperature without trouble in operation.

In addition, when the electric heater of the present invention is used on the electric heating cable, it is hardly to be failed to generate heat in a certain zone section of the cable or to happen an incomplete contact even a part of the strands are broken since the temperature cycle changes during a heat generation or external force such as a bending is applied. The reason for a sure-generation of heat and a complete contact is that the electric heater is connected to the respective feeder lines through a number of points. Because the heat generation load of the electric heater due to a temperature rise happened when a current is impressed to the electric heater is distributed, the electric heater of the present invention can be used suitably to sustain a temperature at not only in the range of middle level (50°–120° C.) but also in the range of high level (over 120° C.). In this case, when any thermal insulators of a sheath type such as an inconel-made insulator of ceramic fibers and polyamid fibers, it is possible to provide a heating tube durable to high temperature.

In particular, because a joint for joining forcibly the electric heater to the feeder line is provided according to the present invention, it is hardly that an incomplete contact happens in the electric heater.

What is claimed is:

1. A heat generating cable comprising:
   a feeder line comprising at least two insulatedly covered core wires, each of said wires have an insulated cover and being arranged parallel to each other and having a plurality of exposed portions of said core wires made by cutting off a predetermined zone width of said insulating cover cyclically in a semi-ring shape at a predetermined interval at alternatively different longitudinal positions;
   a resistance comprising a single or a plurality of resistance strands constructed to form a braid structure around said feeder line;
   a connector comprising a single or a plurality of conductive elemental wires braided in a beltlike shape to form a braid structure and wound around said resistance and said feeder line width-wise at the position of each of said exposed portions of said core wires to press said resistance against and into electric connection with said core wires at multiple points thereby defining a plurality of consecutive heating zones of said resistance formed at the joint portions of said resistance and said core wires along said feeder line and corresponding to said zone width; and
   a further insulator circumferentially covering said connectors, said resistance and said feeder line altogether to form a single cable;
   whereby said resistance of the braid structure is heated at every said heating zone due to a Joule effect by the flow of current through said feeder line of said cable.

2. A heat generating cable according to claim 1, wherein said feeder line comprises two wires and is connected to a single-phase alternating current source.

3. A heat generating cable according to claim 1, wherein said feeder line comprises three wires and is connected to a three-phase alternating current source.

4. A heat generating cable comprising:
   a feeder line comprising at least two insulatedly covered core wires, each of said wires have an insulated cover and being arranged parallel to each other and having a plurality of exposed portions of said core wires made by cutting off a predetermined zone width of said insulating cover cyclically in a semi-ring shape at a predetermined interval at alternately different longitudinal positions;
   a resistance comprising a single or a plurality of resistance strands constructed to form a braid structure around said feeder line;
   a connector comprising a single or a plurality of conductive elemental wires braided in a beltlike shape to form a braid structure and wound around said resistance and said feeder line width-wise at the position of each of said exposed portions of said core wires to press said resistance against and into electric connection with said core wires at multiple points thereby defining a plurality of consecutive heating zones of said resistance formed at the joint portions of said resistance and said core wires along said feeder line and corresponding to said zone width;
   a C-shaped fixing piece having the same width as said exposed portions of said feeder line and having a plurality of claws on its inner surface to project therefrom to narrowingly press said resistance from above said connector said resistance against said feeder line and electrically connect thereto at the position of each said exposed portion; and
   an insulator circumferentially covering said fixing pieces, said connectors, said resistance and said feeder line altogether to form a single cable;
   whereby said resistance or the braid structure is heated at every said heating zone due to Joule effect by the flow of current through said feeder line.

5. A heat generating cable according to claim 4, wherein said feeder line comprises two wires and is connected to a single-phase alternating current source.

6. A heat generating cable according to claim 4, wherein said feeder line comprises three wires and is connected to a three-phase alternating current source.

7. A heat generating cable comprising:
   a feeder line comprising at least two insulating covered core wires each of said wires have an insulated cover and being arranged parallel to each other and having a plurality of exposed portions of said core wires made by cutting off a predetermined zone width of said insulating cover cyclically in a semi-ring shape at a predetermined interval at alternately longitudinal positions;
   a resistance comprising a single or a plurality of resistance strands constructed to form a braid structure around said feeder line;
   a connector comprising a single or a plurality of conductive elemental wires braided in a beltlike shape to form a braid structure and wound around said resistance and said feeder line width-wise at the position of each of said exposed portions of said core wires to press said resistance against and into electric connection with said core wires at multiple points thereby defining a plurality of consecutive heating zones of said resistance formed at the joint portions of said resistance and said core wires along said feeder line and corresponding to said zone width;
   a C-shaped fixing piece having the same width as said exposed portions of said feeder line and having a plurality of claws on its inner surface to project therefrom to narrowingly press from above said connector said resistance against and into electric connection with said feeder line at the position of each said exposed portion;
   an insulator circumferentially covering said fixing pieces, said connectors, said resistance and said feeder line altogether; and
   an outer covering comprising a stainless steel sheath wound around said insulator to enclose the outermost layer to form a single cable;
   whereby said resistance of the braid structure is heated at every said heating zone due to a Joule effect by the flow of current through said feeder line of said cable.

8. A heat generating cable according to claim 7, wherein said feeder line comprises two wires and is connected to a single-phase alternating current source.

9. A heat generating cable according to claim 7, wherein said feeder line comprises three wires and is connected to a three-phase alternating current source.

10. A heat generating cable comprising:
a feeder line comprising at least two insulatedly covered core wires each of said wires have an insulated cover and being arranged parallel to each other and having a plurality of exposed portions of said core wires made by cutting off a predetermined zone on width of said insulating cover cyclically in a semi-ring shape at a predetermined interval at alternately different longitudinal positions;
a resistance comprising a plurality of resistance elemental wires braided in a beltlike shape to form a braid structure and arranged parallelly along a longitudinal direction of said feeder line so as to come into multi-point contact at the positions of said exposed portions of said feeder line to make electric connection to said feeder line;
a connector comprising a single or a plurality of conductive elemental wires braided in a beltlike shape to form a braid structure and wound around said resistance and said feeder line width-wise at the position of each of said exposed positions of said core wires to come into multi-point contact with said resistance and electrically connect said resistance to said core wires thereby defining a plurality of consecutive heating zones of said resistance formed at the joint portions of said resistance and said core wires along said feeder line and corresponding to said zone width; and
an insulator circumferentially covering said connectors, said resistance and said feeder line altogether to form a single cable;
whereby said resistance of the braid structure is heated at every said heating zone due to a Joule effect by the flow of current through said feeder line of said cable thereby heating an object to be heated.

11. A heat generating cable according to claim 10, wherein said feeder line comprises two wires and is connected to a single-phase alternating current source.

12. A heat generating cable according to claim 10, wherein said feeder line comprises three wires and is connected to a three-phase alternating current source.

13. A heat generating cable comprising:
a feeder line comprising at least two insulatedly covered core wires each of said wires have an insulated cover and being arranged parallel to each other and having a plurality of exposed portions of said core wires made by cutting off a predetermined zone width of said insulating cover cyclically in a semi-ring shape at a predetermined interval at alternately different longitudinal positions;
a resistance comprising a plurality of resistance elemental wires braided in a beltlike shape to form a braid structure and arranged parallelly along a longitudinal direction of said feeder line so as to come into multi-point contact at the positions of said exposed portions of said feeder line to make electric connection to said feeder line;
a connector comprising a single or a plurality of conductive elemental wires braided in a beltlike shape to form a braid structure and wound around said resistance and said feeder line width-wise at the position of each of said exposed positions of said core wires to come into multi-point contact with said resistance and electrically connect said resistance to said core wires thereby defining a plurality of consecutive heating zones of said resistance at the joint portions of said resistance and said core wires along said feeder line and corresponding to said zone width;
a C-shaped fixing piece having the same width as said exposed portions of said feeder line and having a plurality of claws on its inner surface to project therefrom to narrowingly press and electrically connect said connector to said feeder line at the position of each exposed portion; and
an insulator circumferentially covering said fixing piece, said connector, said resistance and said feeder line together to form a single cable;
whereby said resistance of the braid structure is heated at every said heating zone due to a Joule effect by the flow of current through said feeder line of said cable thereby heating an object to be heated.

14. A heat generating cable according to claim 13, wherein said feeder line comprise two wires and is connected to a single-phase alternating current source.

15. A heat generating cable according to claim 13, wherein said feeder line comprise three wires and is connected to a three-phase alternating current source.

16. A heat generating cable comprising:
a feeder line comprising at least two insulatedly covered core wires each of said wires have an insulated cover and being arranged parallel to each other and having a plurality of exposed portions of said core wires made by cutting off a predetermined zone width of said insulating cover cyclically at a predetermined interval at alternately different longitudinal positions;
a resistance comprising a plurality of resistance elemental wires braided in a beltlike shape to form a braid structure and arranged parallelly along a longitudinal direction of said feeder line so as to come into multi-point contact at the positions of said exposed portions of said feeder line to make electric connection to said feeder line;
a connector comprising a single or a plurality of conductive elemental wires braided in a beltlike shape to form a braid structure and wound around said resistance and said feeder line width-wise at the position of each of said exposed portions of said core wires to come into multi-point contact with said resistance and electrically connect said resistance to said core wires thereby defining a plurality of consecutive heating zones of said resistance formed at the joint portions of said resistance and said core wires along said feeder line and corresponding to said zone width;
a C-shaped fixing piece having the same width as said exposed portions of said feeder line and having a plurality of claws on its inner surface to project therefrom to narrowingly press said connector against said feeder line and electrically connect thereto at the position of each said exposed portion;
an insulator circumferentially covering said fixing pieces, said connectors, said resistance and said feeder line altogether; and an outer cover comprising a stainless steel sheath wound around said insulator to enclose the outermost layer to form a single cable;

whereby said resistance of the braid structure is heated at every said heating zone due to a Joule effect by the flow of current through said feeder line of said cable.

17. A heat generating cable according to claim 16, wherein said feeder line comprises two wires and is connected to a single-phase alternating current source.

18. A heat generating cable according to claim 16, wherein said feeder line comprises three wires and is connected to a three-phase alternating current source.

* * * * *